(12) United States Patent
Nakade

(10) Patent No.: US 12,377,810 B2
(45) Date of Patent: Aug. 5, 2025

(54) RELEASE MECHANISM OF AIRBAG MOORING MEMBER

(71) Applicant: NIPPON KAYAKU KABUSHIKI KAISHA, Tokyo (JP)

(72) Inventor: Kazuki Nakade, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/845,930

(22) PCT Filed: Feb. 24, 2023

(86) PCT No.: PCT/JP2023/006887
§ 371 (c)(1),
(2) Date: Sep. 11, 2024

(87) PCT Pub. No.: WO2023/181786
PCT Pub. Date: Sep. 28, 2023

(65) Prior Publication Data
US 2025/0196798 A1      Jun. 19, 2025

(30) Foreign Application Priority Data

Mar. 22, 2022   (JP) .................................. 2022-046142

(51) Int. Cl.
*B60R 21/2338*      (2011.01)
*B60R 21/239*       (2006.01)

(52) U.S. Cl.
CPC ........ *B60R 21/2338* (2013.01); *B60R 21/239* (2013.01); *B60R 2021/23388* (2013.01); *B60R 2021/2395* (2013.01)

(58) Field of Classification Search
CPC .............. B60R 21/2338; B60R 21/239; B60R 2021/23388; B60R 2021/2395
See application file for complete search history.

(56) References Cited

U.S. PATENT DOCUMENTS 5,887,894 A       3/1999   Castagner et al.
7,419,184 B2 *    9/2008   Green ................... B60R 21/231
                                                          280/736
(Continued)

FOREIGN PATENT DOCUMENTS

DE        102012013212 A1 *   1/2014    ......... B60R 21/2338
DE        102013013177 A1 *   2/2015    ......... B60R 21/2338
(Continued)

OTHER PUBLICATIONS

International Search Report issued Mar. 28, 2023 in PCT/JP2023/006887, filed on Feb. 24, 2023, 2 pages.

*Primary Examiner* — Drew J Brown
(74) *Attorney, Agent, or Firm* — Oblon, McClelland, Maier & Neustadt, L.L.P.

(57) ABSTRACT

Provided is a release mechanism of an airbag mooring member capable of reducing the size or the number of parts as compared with the related art. A release mechanism 100 of an airbag mooring member includes a housing 10, a cylindrical member 20 including a portion fitted into the housing 10, an igniter 30 including a portion fitted into the cylindrical member 20, a holder 40 that holds the housing 10, the cylindrical member 20, and the igniter 30, and an airbag mooring member 70 used for adjusting inflation of an airbag. The cylindrical member 20 is a bottomed cylindrical member including an opening portion provided at one end portion, and includes a bottom portion 21, a cylindrical portion 22, and a flange portion 23. The bottom portion 21 is provided at the other end portion of the cylindrical member 20 and includes a regulation hole 21a formed at a substantially central portion. The regulation hole 21a can regulate spread of flame emitted from the igniter 30.

3 Claims, 4 Drawing Sheets

(56) References Cited

U.S. PATENT DOCUMENTS

| | | | |
|---|---|---|---|
| 8,602,453 B1 * | 12/2013 | Stevens | B60R 21/217 |
| | | | 280/743.2 |
| 11,912,221 B2 * | 2/2024 | Peremarty | B60R 21/16 |
| 2006/0237956 A1 | 10/2006 | Fellhauer et al. | |
| 2006/0284404 A1 * | 12/2006 | Green | B60R 21/231 |
| | | | 280/743.2 |
| 2008/0157512 A1 | 7/2008 | Stevens | |
| 2012/0242069 A1 * | 9/2012 | Parks | B60R 21/2338 |
| | | | 280/743.2 |
| 2013/0038046 A1 * | 2/2013 | Inuzuka | B23D 15/145 |
| | | | 89/1.14 |
| 2025/0050834 A1 * | 2/2025 | Furtado | B60R 21/2338 |

FOREIGN PATENT DOCUMENTS

| | | | | |
|---|---|---|---|---|
| EP | 3950437 A1 * | 2/2022 | | B60R 21/217 |
| JP | 2008-162584 A | 7/2008 | | |
| JP | 2013-35473 A | 2/2013 | | |
| WO | WO-2022233477 A1 * | 11/2022 | | B60R 21/2338 |

* cited by examiner

RELEASE MECHANISM OF AIRBAG MOORING MEMBER

TECHNICAL FIELD

The present invention relates to a release mechanism of an airbag mooring member used for a safety device of an automobile or the like and used for adjusting inflation of an airbag.

BACKGROUND ART

Conventionally, airbag devices have been widely used from the viewpoint of protecting an occupant of an automobile or the like. Such an airbag device may include a starting device disposed within a housing and configured to provide a unique seal to prevent external release of pyrotechnic residues during deployment, a cutter operatively connected to the starting device such that deployment of the starting device actuates the cutter, and a release mechanism of an airbag mooring member configured to fix the mooring member until the airbag mooring member is released by activation of the cutter. Here, as the release mechanism of the airbag mooring member, for example, there is one described in Patent Literature 1 below.

CITATIONS LIST

Patent Literature

Patent Literature 1: JP 4950189 B2

SUMMARY OF INVENTION

Technical Problems

In Patent Literature 1, the mooring member can be easily cut by the activation of the release mechanism of the airbag mooring member. However, in recent years, it is desired to further reduce the size or the number of parts of such a release mechanism of the mooring member.

Therefore, an object of the present invention is to provide a release mechanism of an airbag mooring member capable of reducing the size or the number of parts as compared with the related art.

Solutions to Problems (1) The present invention is a release mechanism of an airbag mooring member used for adjusting inflation of an airbag, the release mechanism including: a housing including a first cylindrical portion in which a pair of holes through which the airbag mooring member passes is formed, an opening portion provided at one end portion of the first cylindrical portion, and a bottom portion provided at another end portion of the first cylindrical portion; a cylindrical member including a second cylindrical portion provided in a state where the pair of holes is not closed from the opening portion of the housing and including an outer wall surface having a shape same as an inner wall surface of the housing, an opening portion provided at one end portion of the second cylindrical portion, and a bottom portion provided at another end portion of the second cylindrical portion; an igniter including a cup-shaped member including an outer wall surface having a shape same as an inner wall surface of the cylindrical member, at least a tip portion of the cup-shaped member being fitted into one end portion side of the cylindrical member; and a holder that holds the housing, the cylindrical member, and the igniter, in which a regulation hole that regulates spread of flame generated at a time of activation of the igniter is formed in the bottom portion of the cylindrical member.

(2) In the release mechanism of an airbag mooring member of (1) described above, a recess recessed toward an inner side of the housing is preferably formed at a position facing the regulation hole in the bottom portion of the housing.

(3) As another aspect, the present invention is a release mechanism of an airbag mooring member used for adjusting inflation of an airbag, the release mechanism including: a housing including a first cylindrical portion in which a pair of holes through which the airbag mooring member passes is formed, an opening portion provided at one end portion of the first cylindrical portion, and a bottom portion provided at another end portion of the first cylindrical portion; a cylindrical member including a second cylindrical portion including an outer wall surface having a shape same as an inner wall surface of the first cylindrical portion, an opening portion provided at one end portion of the second cylindrical portion, and a bottom portion provided at another end portion of the second cylindrical portion; an igniter including a cup-shaped member including an outer wall surface having a shape same as an inner wall surface of the cylindrical member, at least a tip portion of the cup-shaped member being inserted into one end portion side of the cylindrical member; and a holder that holds the housing, the cylindrical member, and the igniter, in which in the cylindrical member, a head portion having a predetermined thickness is formed on a bottom portion side of the cylindrical member, and a weak portion is formed on an outer periphery or an inner periphery closer to the igniter than the head portion, a through hole through which the airbag mooring member passes is formed in the head portion in correspondence with positions of the pair of holes in an initial state, and a space in which the head portion moves when the weak portion breaks at a time of activation of the igniter is formed between a tip portion of the head portion and a bottom portion of the housing.

According to the configurations (1) to (3) described above, it is possible to provide a release mechanism of an airbag mooring member capable of reducing the size or the number of parts as compared with the related art. Note that, by reducing the number of parts, the cost can be reduced as compared with the related art.

DESCRIPTION OF EMBODIMENTS

First Embodiment

Hereinafter, a release mechanism of an airbag mooring member according to a first embodiment of the present invention will be described with reference to the drawings.

Figure 1:
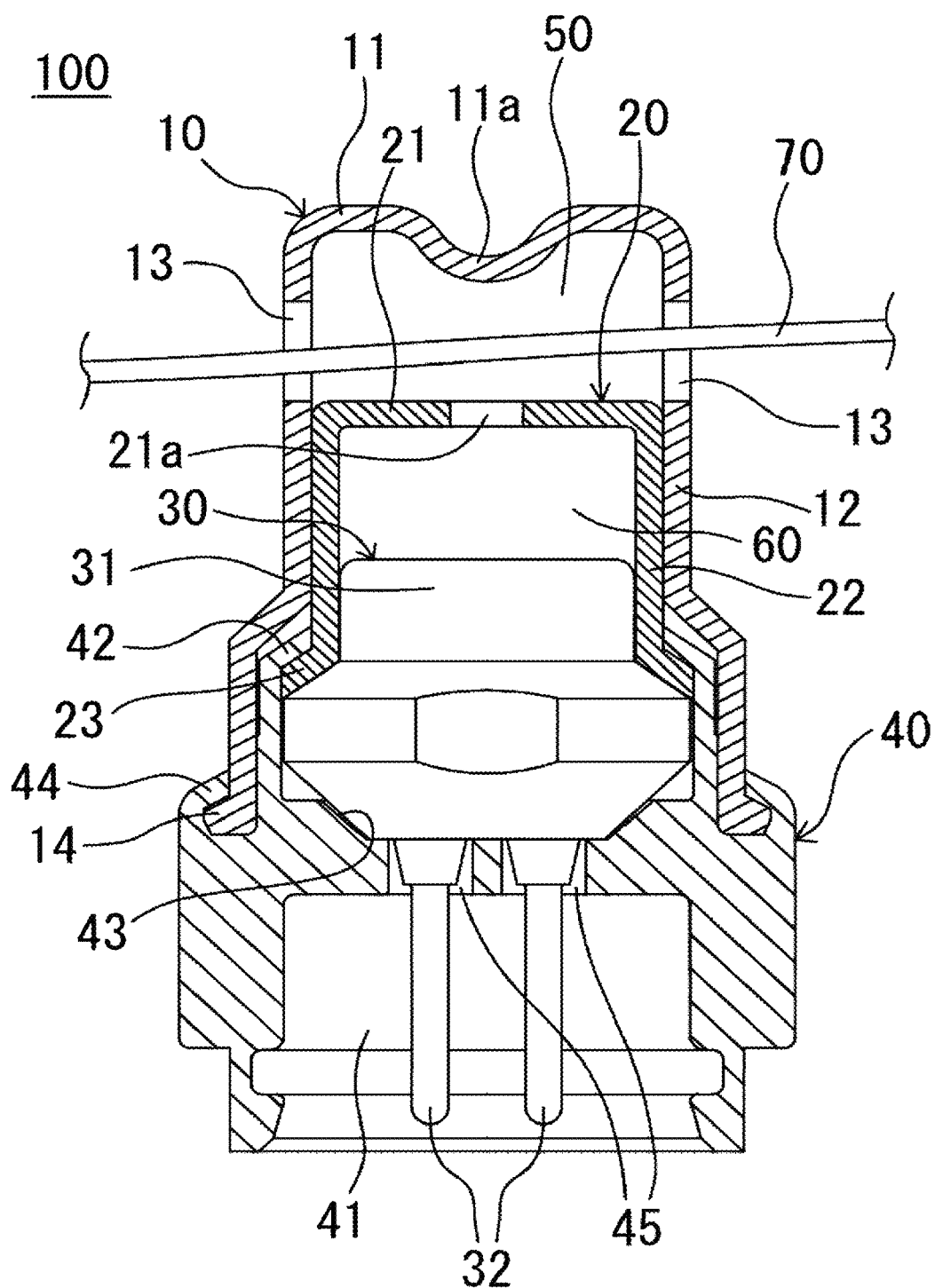
FIG. 1 is a cross-sectional view illustrating a release mechanism of an airbag mooring member according to a first embodiment of the present invention.

As illustrated in FIG. 1, a release mechanism 100 of an airbag mooring member of the present embodiment includes a housing 10, a cylindrical member 20 including a portion fitted into the housing 10, an igniter 30 including a portion fitted into the cylindrical member 20, a holder 40 that holds (locks) the housing 10, the cylindrical member 20, and the igniter 30, and an airbag mooring member 70 used for adjusting inflation of an airbag.

The housing 10 is a bottomed cylindrical member including an opening portion at one end portion, and includes a bottom portion 11, a cylindrical portion 12, a pair of holes 13, and a flange portion 14. The bottom portion 11 is provided at the other end portion of the housing 10, and includes a recess 11a formed to be recessed toward an inner side of the housing 10 at a position facing a regulation hole 21a described later in an axial direction. Note that the recess 11a is formed as necessary. Furthermore, the pair of holes 13 are portions provided in the cylindrical portion 12 such that the airbag mooring member 70 (for example, a tether or the like) can penetrate and be installed. The flange portion 14 is caulked and fixed to the holder 40 by an outer end portion 44 described later.

The cylindrical member 20 is a bottomed cylindrical member including an opening portion provided at one end portion, and includes a bottom portion 21, a cylindrical portion 22, and a flange portion 23. The bottom portion 21 is provided at the other end portion of the cylindrical member 20 and includes a regulation hole 21a formed at a substantially central portion. The regulation hole 21a can regulate spread of flame emitted from the igniter 30. The cylindrical portion 22 includes an outer wall surface having the same shape as an inner wall surface of the cylindrical portion 12 of the housing 10, and is fitted into the cylindrical portion 12 from an opening portion side of the housing 10 to a position where the pair of holes 13 is not closed. The flange portion 23 is caulked and fixed to the holder 40 by an end portion 42. Furthermore, a space 50 is formed between the bottom portion 11 of the housing 10 and the bottom portion 21 of the cylindrical member 20.

The igniter 30 includes a cap member 31 that covers an ignition portion (not illustrated), and a pair of terminal pins 32 that is connected to the ignition portion and to which a predetermined amount of current is supplied. When the vehicle collides, a collision is detected by a collision detection means (not illustrated) provided in the vehicle, and based on this, the igniter 30 is energized from a control unit provided in the vehicle to the ignition portion via the terminal pins 32, thereby being activated.

Furthermore, the igniter 30 is fixed in a state where the pair of terminal pins 32 is inserted into a pair of holes 45 formed in a substantially central portion of the holder 40 in a state where a central axis of the igniter 30 itself and a central axis of the holder 40 substantially coincide with each other. Furthermore, a space 60 is formed between a tip portion of the cap member 31 and the bottom portion 21 of the cylindrical member 20.

The holder 40 has a substantially cylindrical shape, and is a metal integrally molded product including a female connector portion 41, an end portion 42, a hole 43, and an outer end portion 44. Note that the end portion 42 has a substantially cylindrical shape before the flange portion 23 is caulked and fixed, and is pressed and deformed at the time of caulking and fixing. Similarly, the outer end portion 44 has a substantially cylindrical shape before the flange portion 14 is caulked and fixed, and is pressed and deformed at the time of caulking and fixing. Furthermore, the hole 43 is formed in a substantially central portion of the holder 40 so that the igniter 30 can be fitted thereinto.

Figure 2:
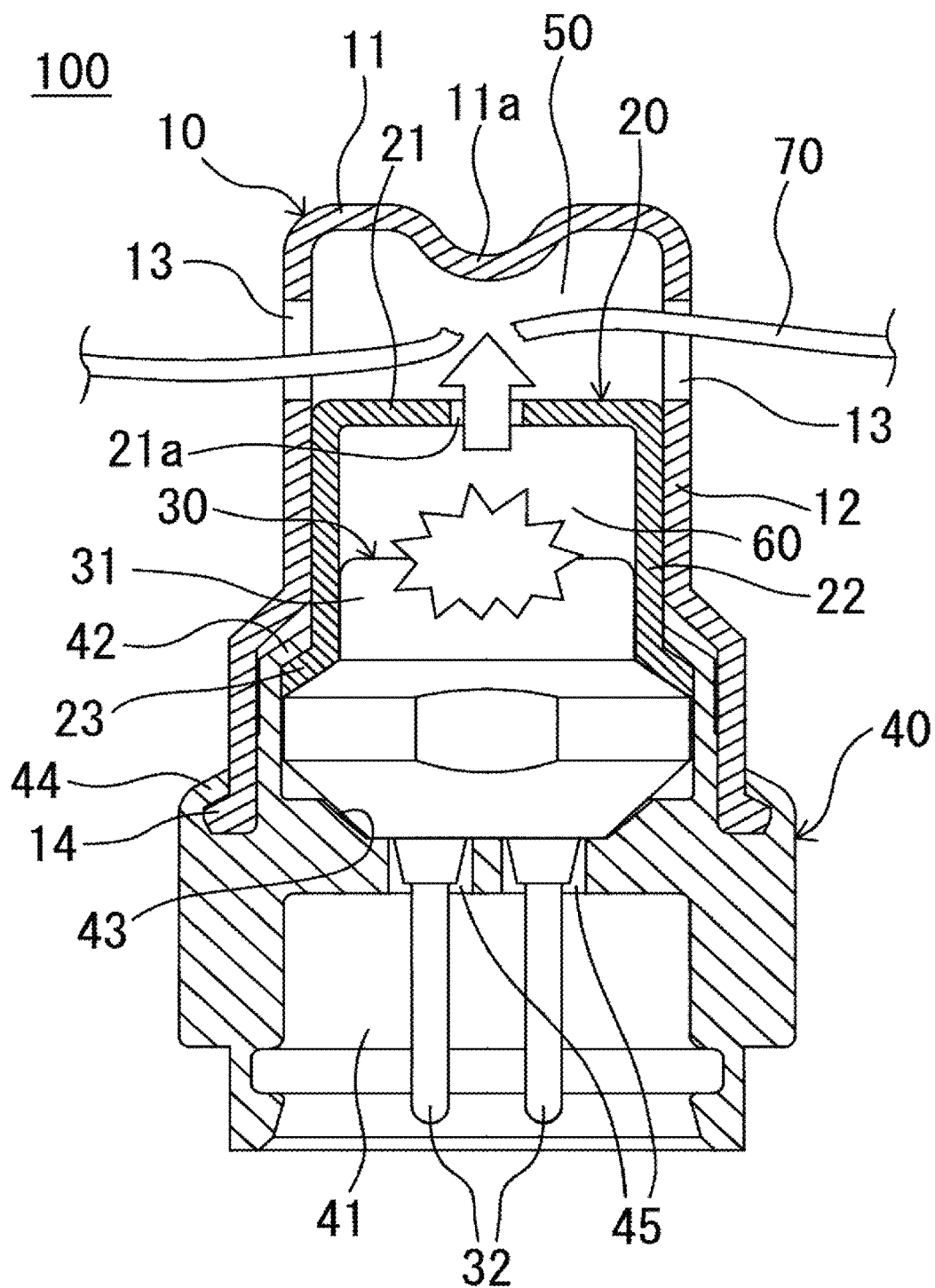
FIG. 2 is a cross-sectional view illustrating the release mechanism of the airbag mooring member in FIG. 1 after operation.

In the release mechanism 100 of the airbag mooring member having the above-described configuration, the flame generated by the activation of the igniter 30 is regulated and aggregated by the regulation hole 21a so as not to spread. Then, in the space 50, the airbag mooring member 70 receiving the flame aggregated by the regulation hole 21a is fused (see FIG. 2). At this time, the airbag mooring member 70 is pushed toward the bottom portion 11 by receiving a pressure wave together with the flame, but is restricted from moving toward the bottom portion 11 by the recess 11a. As a result, the airbag mooring member 70 more intensively receives the flame and is easily fused. Then, an airbag (not illustrated) is released from the adjustment (mooring) of the inflation by the airbag mooring member 70.

According to the present embodiment, a space larger than or equal to a hole diameter of the pair of holes 13 for allowing the airbag mooring member 70 to pass therethrough is not required, and a moving member (such as a cutter) that requires a distance for giving acceleration along the axial direction of the housing 10 as in the related art is not provided, so that an axial direction length of the housing 10 can be made shorter than in the related art. That is, according to the present embodiment, it is possible to provide the release mechanism of the airbag mooring member 70 that can be downsized and the number of parts can be reduced as compared with the related art. Note that, by reducing the number of parts, the cost can be reduced as compared with the related art.

Furthermore, according to the present embodiment, since the movement of the airbag mooring member 70 is restricted by the recess 11a, it is possible to more intensively receive flame from the igniter 30 at the time of activation through the regulation hole 21a and to be easily fused.

Second Embodiment

Next, a release mechanism of an airbag mooring member according to a second embodiment will be described. Note that, unless otherwise specified, portions similar to those in the first embodiment are denoted by the same reference signs in the last two digits, and the description thereof may be omitted.

Figure 3:
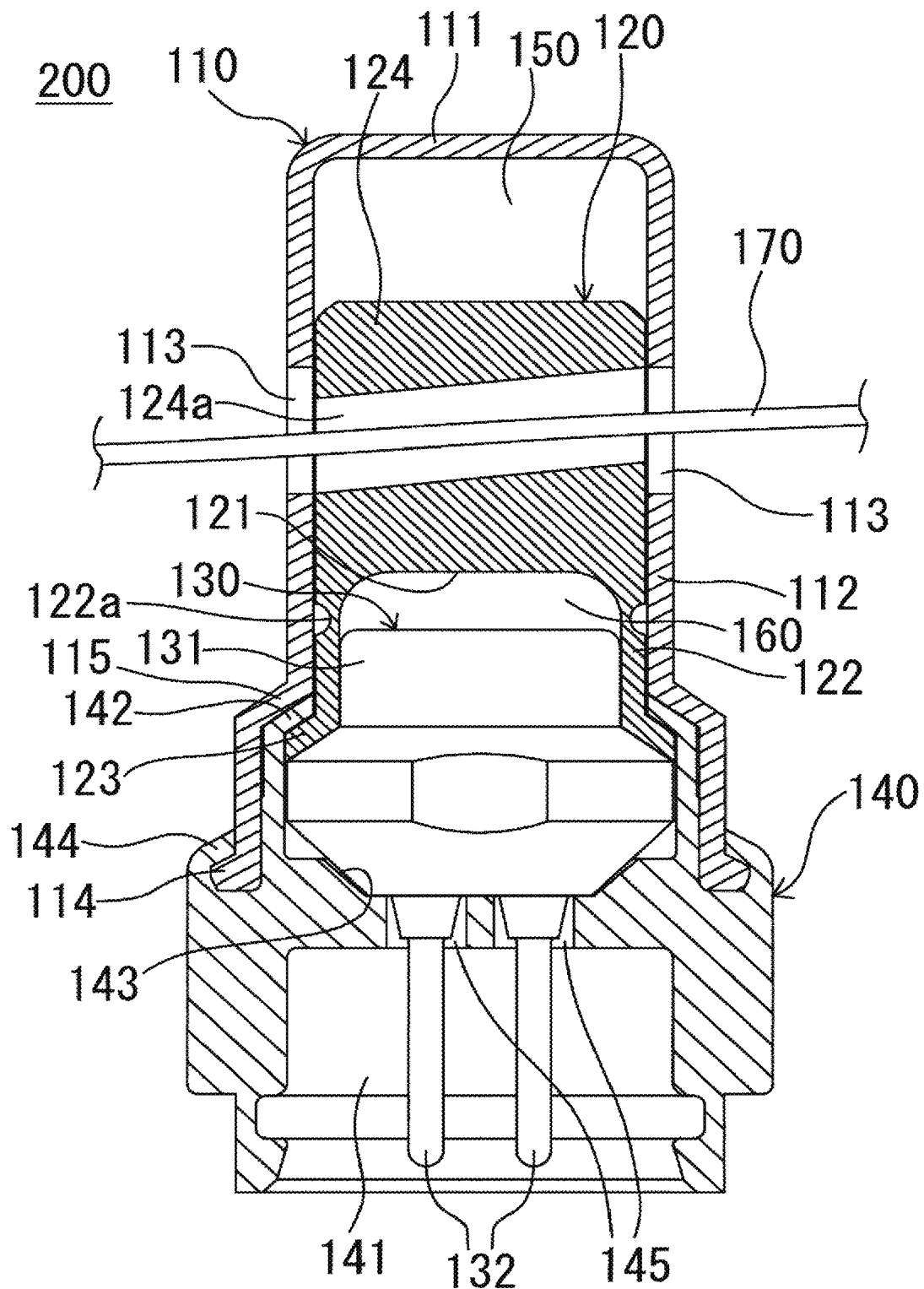
FIG. 3 is a cross-sectional view illustrating a release mechanism of an airbag mooring member according to a second embodiment of the present invention.

As illustrated in FIG. 3, a release mechanism 200 of an airbag mooring member of the present embodiment is different from that of the first embodiment in that a housing 110 and a cylindrical member 120 are used instead of the housing 10 and the cylindrical member 20 of the first embodiment.

The housing 110 is a bottomed cylindrical member including an opening portion at one end portion, and includes a bottom portion 111, a cylindrical portion 112, a pair of holes 113, a flange portion 114, and a caulking portion 115. The bottom portion 111 is provided at the other end portion of the housing 110. Furthermore, in the initial state, the pair of holes 113 are provided in both a through hole 124a and the cylindrical portion 112 to be described later such that the airbag mooring member 170 (for example, a tether or the like) can penetrate therethrough. The caulking portion 115 is a portion where an end portion 142 of the holder 140 is caulked and fixed.

The cylindrical member 120 is a bottomed cylindrical member including an outer wall surface having the same shape as an inner wall surface of the housing 110 and an opening portion provided at one end portion, and includes a bottom portion 121, a cylindrical portion 122, a flange portion 123, and a head portion 124.

An annular weak portion 122a is provided on an outer periphery of the cylindrical portion 122. The weak portion 122a is broken by a pressure wave received at the time of activation of the igniter 130. Note that the weak portion 122a may be provided on an inner periphery of the cylindrical portion 122.

The head portion 124 is provided on the bottom portion 121 on a side of the bottom portion 111 of the housing 110, and a through hole 124a through which the airbag mooring member 170 passes is formed at a position corresponding to the pair of holes 113 in the initial state. That is, as illustrated in FIG. 3, in the initial state, the airbag mooring member 170 passes through the pair of holes 113 and the through hole 124a. Note that the through hole 124a is formed obliquely with respect to the horizontal direction, and for example, in FIG. 3, a shearing force with respect to the airbag mooring member 170 can be concentrated on the hole 113 on a right side and a right portion of the through hole 124a.

The holder 140 is similar to the holder 40 of the first embodiment, but the end portion 142 is caulked and fixed by the caulking portion 115, and the caulking and fixing of the flange portion 123 by the end portion 142 is further strengthened.

Figure 4:
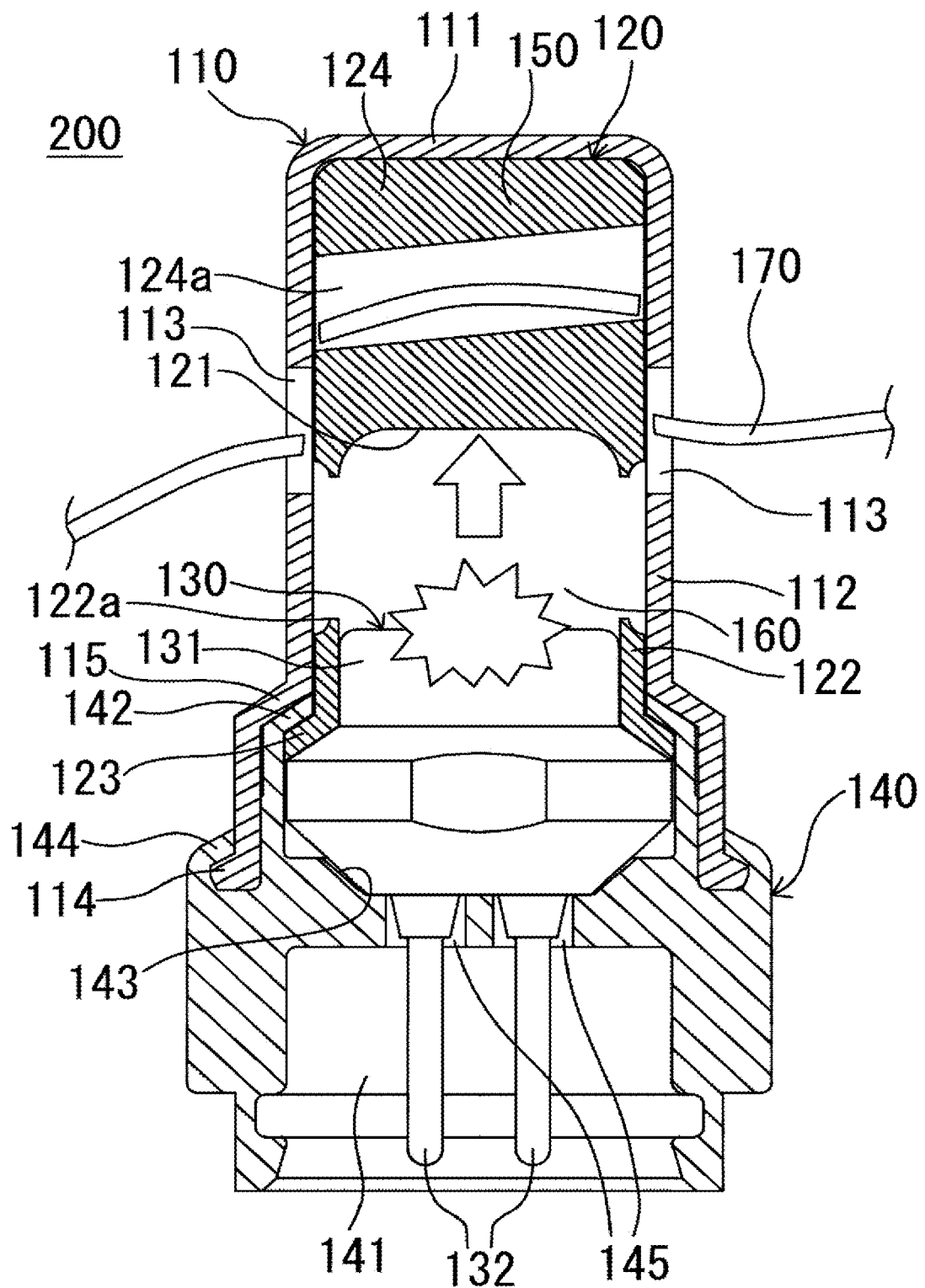
FIG. 4 is a cross-sectional view illustrating the release mechanism of the airbag mooring member in FIG. 2 after operation.

In the release mechanism 200 of an airbag mooring member having the above-described configuration, in a case where the igniter 130 is activated, the bottom portion 121 receives a pressure wave generated from the igniter 130, so that the weak portion 122a breaks, and the bottom portion 121 and the head portion 124 move to a space 150 and are received by the bottom portion 111 of the housing 110 (see FIG. 4). At this time, the airbag mooring member 170 is sheared by the cooperation of the pair of holes 113 and the through hole 124a (see FIG. 4). Then, an airbag (not illustrated) is released from the adjustment (mooring) of the inflation by the airbag mooring member 170.

According to the present embodiment, the members (the head portion 124 and the bottom portion 121) that move at the time of activation are not separated from the cylindrical portion 122 in the initial state. That is, since the head portion 124 and the bottom portion 121 move after the weak portion 122a is broken and separated from the cylindrical portion 122 at the time of activation of the igniter 130, the number of parts can be reduced as compared with the related art, and assembly becomes easy. As a result, the cost can be reduced as compared with the related art.

Furthermore, according to the present embodiment, since the generated internal pressure of the igniter 130 is directly transmitted to the bottom portion 121, it is possible to adjust a force for shearing the airbag mooring member 170 by adjusting an output of the igniter 130 or the vulnerability (radial thickness, material, etc.) of the weak portion 122a, so that the degree of freedom in the material or shape of the airbag mooring member 170 is increased.

Although the embodiments of the present invention have been described above with reference to the drawings, it should be understood that the specific configuration is not limited to these embodiments. The scope of the present invention is defined not by the description of the above embodiments but by the claims, and includes meanings equivalent to the claims and all modifications within the scope.

For example, in the first embodiment, the bottom portion 21 has a flat surface portion. However, as a modification, the bottom portion may have a shape such as a chevron with a pointed tip.

REFERENCE SIGNS LIST 10, 110 housing
11, 111, 21, 121 bottom portion
11a recess
12, 22, 112, 122 cylindrical portion
13, 45, 113, 145 pair of holes
14, 23, 114, 123 flange portion
20, 120 cylindrical member
21a regulation hole
30, 130 igniter
31, 131 cap member
32, 132 terminal pin
40, 140 holder
41, 141 female connector portion
42, 142 end portion
43, 143 hole
44, 144 outer end portion
50, 60, 150, 160 space
70, 170 airbag mooring member
100, 200 release mechanism
115 caulking portion
122a weak portion
124 head portion
124a through hole

The invention claimed is:

1. A release mechanism of an airbag mooring member used for adjusting inflation of an airbag, the release mechanism comprising:
    a housing including a first cylindrical portion in which a pair of holes through which the airbag mooring member passes is formed, an opening portion provided at one end portion of the first cylindrical portion, and a bottom portion provided at another end portion of the first cylindrical portion;
    a cylindrical member including a second cylindrical portion provided in a state where the pair of holes is not closed from the opening portion of the housing and including an outer wall surface having a shape same as an inner wall surface of the housing, an opening portion provided at one end portion of the second cylindrical portion, and a bottom portion provided at another end portion of the second cylindrical portion;
    an igniter including a cup-shaped member including an outer wall surface having a shape same as an inner wall surface of the cylindrical member, at least a tip portion of the cup-shaped member being fitted into one end portion side of the cylindrical member; and
    a holder that holds the housing, the cylindrical member, and the igniter,
    wherein a regulation hole that regulates spread of flame generated at a time of activation of the igniter is formed in the bottom portion of the cylindrical member.

2. The release mechanism of an airbag mooring member according to claim 1, wherein a recess recessed toward an inner side of the housing is formed at a position facing the regulation hole in the bottom portion of the housing.

3. A release mechanism of an airbag mooring member used for adjusting inflation of an airbag, the release mechanism comprising:
    a housing including a first cylindrical portion in which a pair of holes through which the airbag mooring member passes is formed, an opening portion provided at one end portion of the first cylindrical portion, and a bottom portion provided at another end portion of the first cylindrical portion;

a cylindrical member including a second cylindrical portion including an outer wall surface having a shape same as an inner wall surface of the first cylindrical portion, an opening portion provided at one end portion of the second cylindrical portion, and a bottom portion provided at another end portion of the second cylindrical portion;

an igniter including a cup-shaped member including an outer wall surface having a shape same as an inner wall surface of the cylindrical member, at least a tip portion of the cup-shaped member being inserted into one end portion side of the cylindrical member; and a holder that holds the housing, the cylindrical member, and the igniter, wherein in the cylindrical member, a head portion having a predetermined thickness is formed on a bottom portion side of the cylindrical member, and a weak portion is formed on an outer periphery or an inner periphery closer to the igniter than the head portion, a through hole through which the airbag mooring member passes is formed in the head portion in correspondence with positions of the pair of holes in an initial state, and a space in which the head portion moves when the weak portion breaks at a time of activation of the igniter is formed between a tip portion of the head portion and a bottom portion of the housing.

\* \* \* \* \*